US011970193B2

(12) United States Patent
Font et al.

(10) Patent No.: US 11,970,193 B2
(45) Date of Patent: Apr. 30, 2024

(54) RAIL VEHICLE CAR FOR TRANSPORTING PASSENGERS, RAIL VEHICLE WITH A RAIL VEHICLE CAR AND METHOD FOR FORMING A TRANSITION BETWEEN RAIL VEHICLE CARS

(71) Applicant: Stadler Rail AG, Bussnang (CH)

(72) Inventors: Joaquim Font, St. Gallen (CH); Fadi Khairallah, St. Gallen (CH)

(73) Assignee: Stadler Rail AG, Bussnang (CH)

( * ) Notice: Subject to any disclaimer, the term of this patent is extended or adjusted under 35 U.S.C. 154(b) by 327 days.

(21) Appl. No.: 17/346,594

(22) Filed: Jun. 14, 2021

(65) Prior Publication Data

US 2021/0394803 A1 Dec. 23, 2021

(30) Foreign Application Priority Data

Jun. 22, 2020 (EP) .................................... 20181339

(51) Int. Cl.
*B61D 15/06* (2006.01)
*B61D 1/00* (2006.01)
(Continued)

(52) U.S. Cl.
CPC ............... *B61D 15/06* (2013.01); *B61D 1/00* (2013.01); *B61D 17/04* (2013.01); *B61D 17/20* (2013.01); *B61D 19/02* (2013.01); *B61G 11/16* (2013.01)

(58) Field of Classification Search
CPC .......... B61D 1/00; B61D 15/06; B61D 19/00; B61D 19/02; B61D 19/023; B61D 17/04; B61D 17/041; B61D 17/043; B61D 17/06; B61D 17/10; B61D 17/20; B61G 11/16; B61F 19/04
See application file for complete search history.

(56) References Cited

U.S. PATENT DOCUMENTS 2,248,960 A * 7/1941 Collis .................... B61D 17/20 104/30
6,341,563 B1 * 1/2002 Gal ......................... E05F 15/40 105/433

(Continued)

FOREIGN PATENT DOCUMENTS

CN 110593699 A 12/2019
EP 2933167 A1 * 10/2015 ............ B61D 17/10

(Continued)

OTHER PUBLICATIONS

European Search Report Corresponding to 20181339.1 dated Nov. 25, 2020.

*Primary Examiner* — Zachary L Kuhfuss
*Assistant Examiner* — Cheng Lin
(74) *Attorney, Agent, or Firm* — Finch & Maloney PLLC

(57) ABSTRACT

A rail vehicle car for transporting passengers comprising a car body, a car body floor, a car body ceiling and a front end area. An A-pillar is disposed in the front portion. The car body has a longitudinal extent and a transverse extent, and the longitudinal extent is greater than the transverse extent. The car body includes a height extension transverse to the longitudinal and transverse extensions. The A-pillar is substantially centered in the transverse direction so that the front region is divided into a first side and a second side, and the first side comprises 30-70% of the transverse extent.

20 Claims, 3 Drawing Sheets

41 50 55 51 5 1 2 40 53 2 50 52 43 4a 4 4b 6 54 54 54 54 54 4a 42 4 4b 99 98

Figure 1:
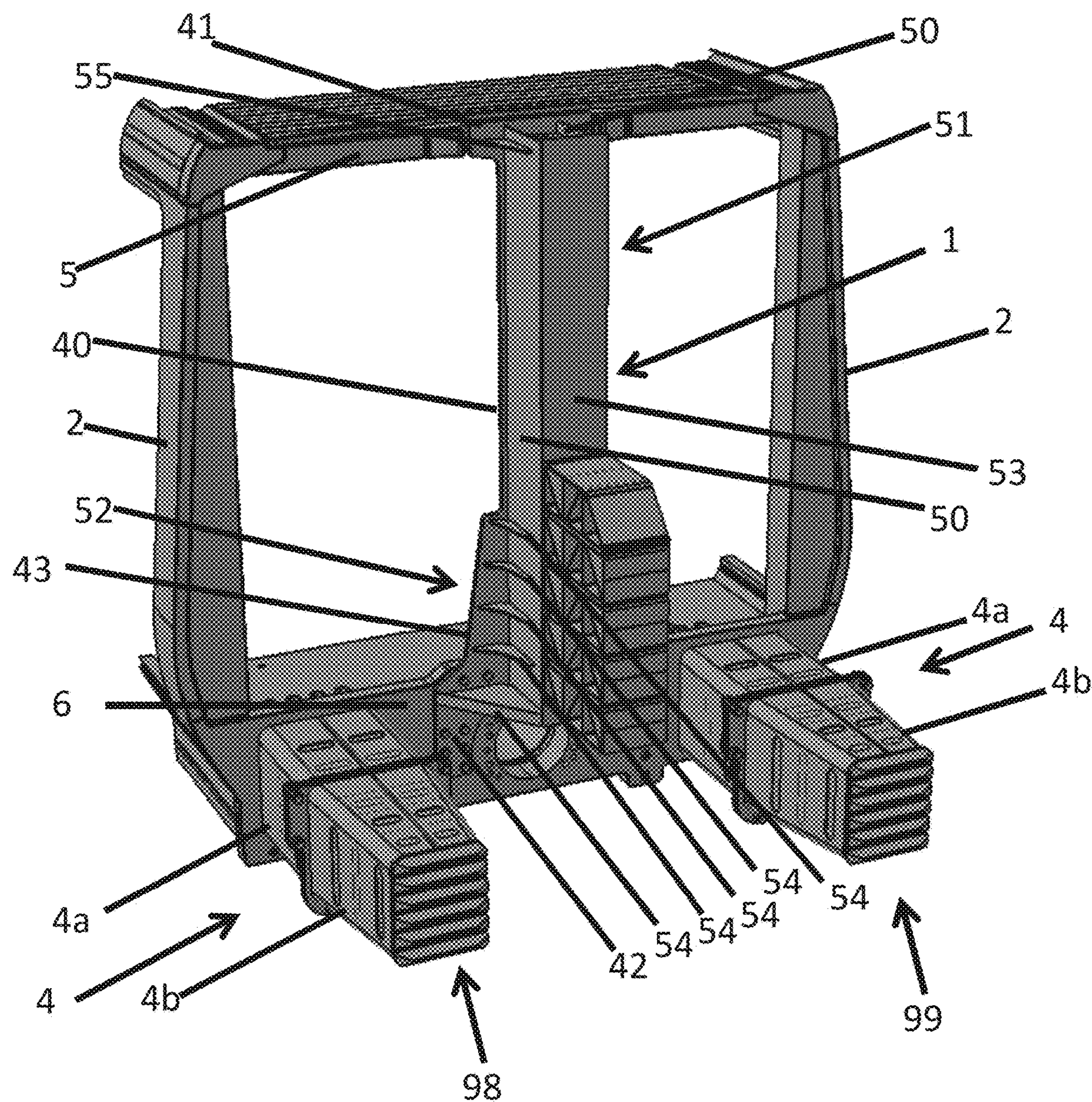

(51) Int. Cl.

| | |
|---|---|
| ***B61D 17/04*** | (2006.01) |
| ***B61D 17/20*** | (2006.01) |
| ***B61D 19/02*** | (2006.01) |
| ***B61G 11/16*** | (2006.01) |

(56) References Cited

U.S. PATENT DOCUMENTS

| | | | | |
|---|---|---|---|---|
| 6,561,105 | B2 * | 5/2003 | Godin | B61D 17/06<br>105/396 |
| 6,799,794 | B2 * | 10/2004 | Mochidome | B62D 21/152<br>296/203.02 |
| 7,536,958 | B2 * | 5/2009 | Bravo | B61C 17/04<br>105/340 |
| 8,683,634 | B2 | 4/2014 | Provost | |
| 9,090,266 | B2 | 7/2015 | Nakao et al. | |
| 9,937,933 | B2 * | 4/2018 | Basily | B61D 23/025 |
| 9,988,061 | B2 * | 6/2018 | Graf | B61D 15/06 |
| 11,130,506 | B2 * | 9/2021 | Yu | B61D 17/06 |
| 2007/0283843 | A1 * | 12/2007 | Kawasaki | B61D 15/06<br>105/396 |
| 2014/0360402 | A1 | 12/2014 | Koudolo et al. | |
| 2015/0191180 | A1 * | 7/2015 | Langert | B61D 17/00<br>105/456 |
| 2020/0122752 | A1 * | 4/2020 | Luo | B61F 19/04 |

FOREIGN PATENT DOCUMENTS

| | | | | | |
|---|---|---|---|---|---|
| EP | 2 451 692 | B1 | | 8/2017 | |
| GB | 2409195 | A | * | 6/2005 | B61D 19/023 |
| JP | 2012-171402 | A | | 9/2012 | |
| WO | 2004/098972 | A1 | | 11/2004 | |
| WO | WO-2004098972 | A1 | * | 11/2004 | B61D 19/023 |
| WO | 2011/142208 | A1 | | 11/2011 | |

* cited by examiner

RAIL VEHICLE CAR FOR TRANSPORTING PASSENGERS, RAIL VEHICLE WITH A RAIL VEHICLE CAR AND METHOD FOR FORMING A TRANSITION BETWEEN RAIL VEHICLE CARS

The invention relates to a rail vehicle car for transporting passengers, a rail vehicle with a rail vehicle car and a method for forming a transition between rail vehicle cars.

In order to guarantee the safety of passengers in a passenger car in the event of a collision, rail vehicle cars must meet certain requirements for structural safety and evacuation possibilities. Such safety requirements are listed, for example, in EN 15227.

The front area of a rail vehicle, for example the area of a rail vehicle car with the driver's cab, is subject to special requirements: In the event of a head-on collision, this front area is the point of impact and is therefore subject to increased safety requirements. At the same time, it is possible that the coupling of several trains with two cars with driver's cabs without front doors may obstruct an evacuation route from a first driver's cab to a second driver's cab.

Rail vehicles with doors at one end of the rail vehicle in the middle of the rail vehicle are known from the prior art, for example in the Class 377, 387, 450 or 458 from Great Britain, the 285 Series, E351 Series and E353 Series from Japan or the ICMm from the Netherlands. These rail vehicles have the disadvantage that the locomotive driver's view is restricted and thus the driver's cab is impaired.

Similarly, rail cars with asymmetrical emergency exit are known, for example from EP2451692, in which passengers can exit the car via a ramp, or JP2012171402, in which passengers can exit the vehicle via a ladder. These arrangements have the disadvantage that no evacuation to a subsequent rail car is possible.

These systems are also very complex and heavy.

Furthermore, a rail vehicle car with four A-pillars arranged symmetrically to the central longitudinal axis of the car is known from WO 11/142 208.

US 2014/360 402 describes a rail vehicle car with a front structure consisting of several struts connected to a horizontally arranged crossbeam.

These constructions have a very complex design and do not have an evacuation possibility into another front car.

It is therefore the task of the invention to overcome the disadvantages of the prior art and in particular to provide a rail vehicle car, a rail vehicle and a method for forming a transition between rail vehicle cars, which have a high crash safety and allow easy evacuation into an adjacent rail vehicle car and a spacious driver's cab with a wide driver's desk without restricting the driver's view.

The task is solved by a rail vehicle car for transporting passengers. The rail vehicle car comprises a car body, a car body floor, a car body ceiling and a front end area. An A-pillar is arranged in the front area. The car body has a longitudinal extent and a transverse extent, and the longitudinal extent is greater than the transverse extent. The car body includes a height extension transverse to the longitudinal and transverse extensions. The A-pillar is substantially centered in the transverse direction such that the front portion is divided into a first side and a second side, the first side comprising 30-70% of the transverse extent.

The rail car is of simple construction and is usable in a wide variety of car types. Further, the invention has the advantage that the safety elements have no aerodynamic influence and the components are protected from external influences. In addition, the invention has the advantage that there is little noise and vibration in the cabin.

In the event of a collision, an A-pillar arranged in this way allows forces to be absorbed essentially in the center, even in the transverse direction. This means that people in the front area are better protected.

The term A-pillar is used here to refer to the equivalent of an A-pillar in motor vehicle construction. In automotive engineering, an A-pillar is the connection between the vehicle roof and the front bulkhead. Similarly, an A-pillar in the context of the present invention is understood to be a pillar in the front end area of a rail vehicle car that extends from the car body floor to the car body ceiling and absorbs structural forces.

In this context, essentially in the center means that the A-pillar is not located in the vicinity of the side wall, but in particular in a range of 30-70% of the transverse extent of the car body.

The A-pillar, which is positioned essentially in the center, can form one end of a car body in the longitudinal direction.

In this way, the A-pillar forms the first impact point in the event of a collision and simply ensures that a survival space is guaranteed for the driver.

The rail vehicle car, in particular the front section, may comprise at least one, preferably at least three, energy absorption elements for absorbing a crash energy.

Energy absorption elements are understood here to mean elements which are designed to dissipate kinetic energy introduced by an impact by deforming materials within the energy absorption elements. In particular, the energy absorption elements have no further function for the statics of the car body.

Such energy absorption elements lead to an increased safety of the passengers in the rail vehicle car.

The energy absorption element(s) can be at least partially made of aluminum or aluminum alloys, preferably EN AW-5754 H111. The energy absorption element(s) may be at least partially made by welding.

Such energy absorption elements are lightweight and easily deformable.

The at least one energy absorption element can be arranged on the A-pillar, preferably in an area below the center in the height direction of the A-pillar.

This eliminates the need for additional supporting structures for the energy absorption elements, which simplifies the construction of the weighing cabinet.

At least one of the energy absorption elements can be arranged on each side of the front area, whereby these energy absorption elements can be arranged lower in the height direction than the energy absorption element arranged on the A-pillar.

As a result, the impact energy is absorbed in a distributed manner over the front area.

The energy absorption elements, in particular the laterally arranged energy absorption elements, can be designed in two parts. A first part element can comprise a crash module and a second part element can comprise a crash box.

The crash module may comprise an aluminum alloy, in particular EN AW-5754 H111. In particular, the crash module may be designed to absorb 800 KJ. The crash box may also comprise an aluminum alloy, in particular EN AW-5754 H111. The crash box may be designed to absorb 300 KJ.

These energy absorption elements expose the passengers and the entire body to a lower deceleration force and prevent undesirable deformations to the car body. The crash module and crash box can include bent and welded aluminum sheets. This allows these elements to be manufactured easily and cheaply. The crash module may be designed to be destroyed in collisions with lower impact energy than the crash box. In particular, the crash module may comprise the shape of a truncated pyramid, preferably with the wide bottom side located at the crash box and the narrower top side located at the end of the car body in the direction of travel. The crash box may be integrated into the structure of the car body, in particular welded to the side pillars. The crash modules can be bolted to the crash box.

This ensures safe energy transfer. The bolted crash modules can be easily replaced after a minor collision.

The first sub-element may comprise an anticlimber.

The body can comprise two columns arranged laterally in the transverse direction, which can be arranged in particular behind the A-pillar in the direction of travel.

This allows improved distribution of the impact energy.

The A-pillar can be connected, in particular bolted, to the body structure via the body floor and the body ceiling.

The A-pillar can be made of steel. The A-pillar can comprise struts, in particular in a lower region in the height direction, for reinforcement against an impact in the direction of travel. The A-pillar can comprise a hollow profile, in particular a rectangular one. The hollow section can be connected at a first end to the vehicle body ceiling and at a second end to the vehicle body floor. Further struts can be arranged in the cavity of the hollow section. This allows the A-pillar to withstand higher forces.

The task is further solved by a rail vehicle wagon, in particular a rail vehicle car as described above. The rail vehicle wagon comprises a wagon body with a front end area. The car body has a longitudinal extension and a transverse extension. The longitudinal dimension is greater than the transverse dimension. The car body includes a height dimension transverse to the longitudinal dimension and the transverse dimension. The sliding vehicle car comprises at least one door with at least one door leaf. The door is disposed in the front end region, wherein the door leaf prevents passage through the door in a closed state. The at least one door is arranged laterally in a transverse direction with respect to a vehicle center so that, when the door leaf is open, the vehicle body can be entered or exited through the vehicle body front. In particular, the at least one door leaf is arranged in a transverse direction substantially in the center of the vehicle in the open state.

This allows an evacuation path in the event of a crash while still providing a sufficient field of view for the vehicle driver.

The rail vehicle body can have only one door in the front area, whereby a control panel for a vehicle driver can be arranged on the side of the body without doors in the front area.

This allows a spacious control panel.

The car body may comprise car body side walls, wherein the car body side walls each comprise a car body inner side and a car body outer side. The door leaf can be openable from the car body inner side and/or from the car body outer side and/or from the inner side of the front area, in particular manually and/or with a switch.

"Manually", in the context of this document, means that the opening movement is performed manually and transmitted mechanically. "With switch" means that the opening is triggered by a switch and transmitted as an electrical or electronic signal to an opening mechanism.

The door panel may have a door panel transverse dimension extending substantially ¼ to ½, preferably substantially ⅓, of the transverse dimension of the front portion.

This allows easy passage during an evacuation with sufficient field of vision for a vehicle driver.

The front area or door wing may be at least partially made of glass, acrylic glass or other transparent material, especially in an upper area in the height direction. The glass, acrylic or transparent material may include a coating such as a protective film to protect the vehicle driver from UV light, laser beams, condensation fogging or icing. The front area may include windshield wipers and/or heating elements to heat the transparent material. The front area may include an air conditioning system. The front area may include impact cushions such as airbags or other supplemental restraint systems for driver protection. The front area may include installed crash sensors and/or deformation sensors. The sensors may be connected to a crash detection system. The front section may include metals and/or plastics and/or carbon fibers.

The door panel may be pivotally and/or slidably disposed.

The rail vehicle car may include a sliding step in the front section for transition to an adjacent rail vehicle car or another step.

This allows easy evacuation from a first sliding vehicle car to a second rail vehicle car. The sliding step can be retractable and extendable along the direction of travel and/or can be folded out and/or pivoted. The sliding step can comprise a sensor for measuring a possible exit depth and, in particular, a control or regulation system for regulating the extension of the sliding step.

This allows easy adjustment of the exit depth, for example when the coupling is deflected in a curve, whereby gaps can be avoided and therefore the vehicle car can be safely and easily entered and exited through the front door.

The vehicle body floor may be arranged such that the vehicle body floor includes a vehicle body floor interior height, wherein the sliding step is arranged substantially at vehicle body floor interior height in alignment with the vehicle body floor. The sliding step may comprise anti-rutting elements.

The rail vehicle car may comprise at least one railing to secure access to the sliding step and/or transition step.

This makes a transition between rail vehicle cars safer. The railing may include marking elements to improve visibility of the railing or the direction of escape, such as light reflex strips or signal lights. The railing may be located within the car body in a retracted position. In an extended position, the railing can be arranged in such a way that a part of the railing is arranged inside the car body and a last part is arranged outside the car body.

This avoids tripping hazards such as height differences or slippery surfaces and makes it safer to exit the vehicle car.

The sliding step can be essentially as wide as the door and, in particular, extend up to 600 mm. The railing may be switch and/or manually operable. The railing can include a distance sensor, in particular an ultrasonic sensor, for determining a possible extension distance.

This can ensure that the railing bridges the necessary distance to the next rail vehicle car.

This prevents a narrowing of the escape route and thus a possible congestion zone. The sliding step can thus be easily extended to a distance from an adjacent rail vehicle car. No dangerous gaps are created.

The rail vehicle car can comprise at least a first part of a coupling in the front area.

This allows the rail vehicle front car to be easily connected to other cars.

The rail vehicle may comprise at least one fixed transition step, which is preferably arranged above the at least first part of the coupling.

Thus, a transition step can be easily provided over the coupling.

The transition step may comprise a step surface having a step surface length formed in the longitudinal direction of extension of the car body and a step surface width formed transversely to the longitudinal direction of extension of the car body. The shape of the tread surface can be selected such that deflection of the coupling and/or extension of the sliding step is not impeded, in particular the tread surface length and/or the tread surface width can be smaller at least on one side in an outer tread surface region than in the central region of the tread surface or on the other side of the tread surface. Preferably, the shape of the tread surface can be rounded and/or beveled to keep free movement areas, which are to be kept free for the movement when deflecting or moving the car body and/or other elements of the rail vehicle car. In particular, the shape of the tread surface may be polygonal with one long side and a plurality of smaller sides, preferably the tread surface may comprise substantially the shape of a bisected decagon with one long side along a bisecting line and five shorter sides. In particular, the transition tread comprises a tread length of 285 mm.

This provides both an easy and safe transition across the coupler without damaging the transition step or the car during deflection. The transition step may include other indentations or recesses. The transition step may include a grating. The transition step may comprise an anti-slip surface.

The railing may include a handrail, the handrail being telescopically extendable.

This allows easy adjustment of the depth of exit of the handrail. The handrail may include fasteners such as hooks or pins for releasable connection to a front portion of another rail vehicle car. The front portion of the rail vehicle car may include fasteners for connection to fasteners of a handrail of an adjoining rail vehicle car.

The railing may comprise at least one railing post hingedly disposed on the handrail. The railing may comprise a bottom rail, the bottom rail being foldably arranged on the handrail and/or on the car body.

In this way, the railing is more stable. The bottom rail may be telescopically extendable. The bottom rail may include releasable fasteners such as pivoting hooks or extendable pins for fastening the bottom rail to a step, another bottom rail of another rail car, or to the front portion of another rail car. The lower chord may be attached to a step or may be at least partially integrated into the step.

The front area may comprise a cover, the cover comprising in particular fiberglass-reinforced plastic.

This improves the aerodynamics in a simple way and protects the supporting elements such as the A-pillar or the crash elements from external influences of rain or solar radiation.

The rail car can include a ladder for train-to-track evacuation.

Thus, evacuation is possible even if the rail car is the first or last car of the train.

The ladder may be arranged vertically inside the car body in a stowed condition. Preferably, the car body floor may comprise fastening elements for attaching the ladder, in particular the ladder in a used state may be arranged at the fastening elements in such a way that one ladder end is arranged in height direction at car floor interior height and a second ladder end is arranged lower than the car floor interior height.

The ladder can thus be easily stowed.

The task is further solved by a rail vehicle with at least one rail vehicle car as described above.

The task is further solved by a method for forming a transition between rail vehicle cars, comprising the steps:

Providing a first and a second rail vehicle car each having a sliding step and each having a door leaf, in particular two rail vehicle cars as previously described, in particular issuing a command to form a transition, in particular by pressing a first switch, preferably a switch in the first rail vehicle car, extending the respective sliding steps of the first and the second rail vehicle car, opening the respective door leaves of the first and the second rail vehicle car, in particular, evacuating the persons from the first rail vehicle car via the sliding steps into the second rail vehicle car.

This method enables easy evacuation of passengers from the first car to the second car.

The method may comprise the following steps:

In particular, issuing a closing command, in particular by pressing a second switch, preferably a switch in the second rail vehicle car, closing the door leaves, retracting the sliding steps.

In this way, passengers can be easily prevented from returning to the danger zone after evacuation.

The method may include the following step:

Turning on the vehicle headlights for illumination.

This allows for safer passage over the steps.

The method may further comprise the following step:

Extending and/or folding out a guardrail.

This can prevent passengers from falling or being pushed down from the crossing during evacuation.

The invention is further explained with reference to the following figures. The figures show FIG. 1 A perspective view of a front section of a car body structure FIG. 2 A perspective view of a front area of a rail vehicle car FIG. 3 A perspective view of a coupling part with a transition step FIG. 4 A perspective view of a transition between two rail vehicle cars FIG. 1 shows a perspective view of a front area 100 of a car body structure. A car body structure with a car body ceiling 5 and a car body floor 6 is shown. The car body ceiling 5 and the car body floor 6 are connected to each other via an A-pillar 1. The A-pillar 1 is arranged substantially centrally in a transverse extent of the car body structure, so that the front area 100 is divided into two sides 98 and 99. The sides 98 and 99 each comprise a side pillar 2.

The A-pillar 1 is arranged at one end of the body structure in the direction of travel.

FIG. 1 also shows two side energy absorption elements 4 and a center energy absorption element 3. The center energy absorption element 3 is arranged at a lower region of the A-pillar.

One side energy absorption element 4 is arranged on each side column 2. The side energy absorption elements 4 are arranged lower than the center energy absorption element 3 in a height direction of the car body structure. The side energy absorption elements 4 each comprise two sub-elements: a crash box 4*a* and a crash module 4*b*. These two sub-elements comprise bent and welded aluminum sheets. They are designed to protect passengers by absorbing forces. The crash box 4*a* is essentially cuboid-shaped and is welded to the respective side pillar 2. The crash module 4*b* comprises essentially the shape of a truncated pyramid and is bolted to the crash box 4*a* via a connecting plate.

The A-pillar 1 comprises a front plate 53, a rear plate 40 and two side plates 50*a* and 50*b*. These plates are welded together to form a rectangular hollow section. The back plate 40 is bolted at a first end in an upper region 51 of the A-pillar 1 to the front side of the car body ceiling 5 and at a second end in a lower region 52 of the A-pillar 1 to the front side of the car body floor 6. The first end of the back plate 40 includes a widening 41 in the transverse direction. The widening 41 is connected to a side plate 50*a* and 50*b* via a respective stiffening element 55 (only one stiffening element 55 can be seen here). The second end of the back plate 40 comprises two wing elements 42 (only one wing element 42 can be seen here). The lower portion 52 of the A-pillar 1 comprises a widening 43 of the back plate 40 in the transverse direction, which increases in the direction of the wing elements 42. The side plates 50*a* and 50*b* are each connected to the extension 43 via five bracing elements 54 of different sizes (only one side plate connection can be seen here).

In the event of a head-on collision, the energy dissipation elements 3 and 4 deform and thus dissipate kinetic energy. In the event of a minor collision, only the crash modules 4*b* are deformed and can then simply be replaced. The A-pillar 1, on the other hand, is designed to be stable enough to guarantee a survival space for the vehicle driver and passengers even in the event of a severe crash. A-pillar 1 meets the requirements defined in scenario 3 of EN15227.

Figure 2:
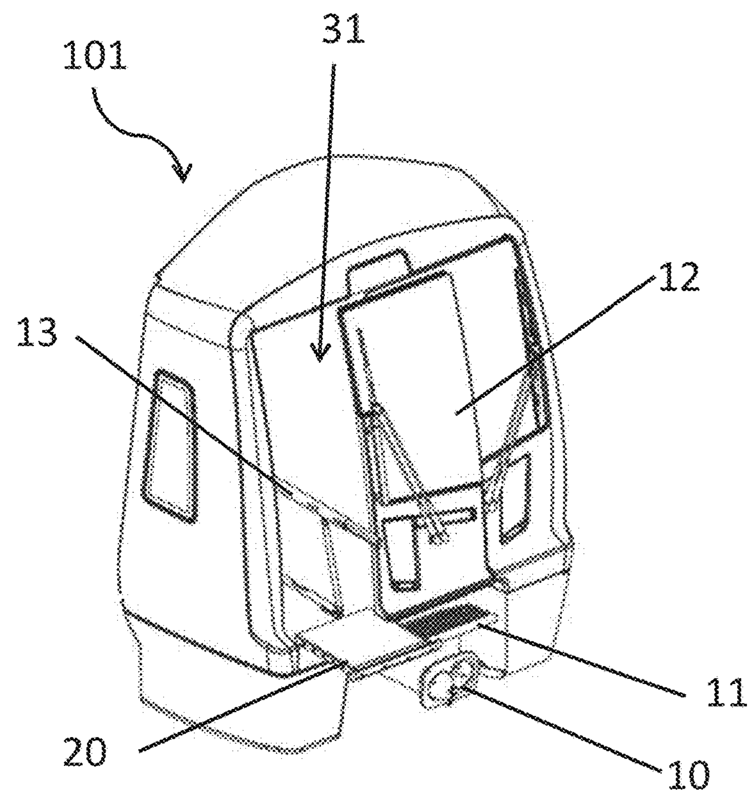

FIG. 2 shows a front area of a rail vehicle car 101. A door opening 31 in the front can be seen. The door opening 31 is arranged decentrally in the transverse direction. A door wing 12 is further shown in an open state, in which the rail vehicle car 101 can be exited through the door opening 31 in the front. The door leaf 12 is arranged substantially centrally in the transverse direction in the open state.

A sliding step 20 is arranged below the door opening 31. Here, the sliding step 20 is shown in an extended state. The sliding step 20 is retracted and extended in or parallel to the direction of travel.

Also shown is a railing 13 which has been extended through the door opening 30.

The figure further shows a part of a coupling 10. A fixed transition step 11 is arranged above the coupling part 10.

Figure 3:
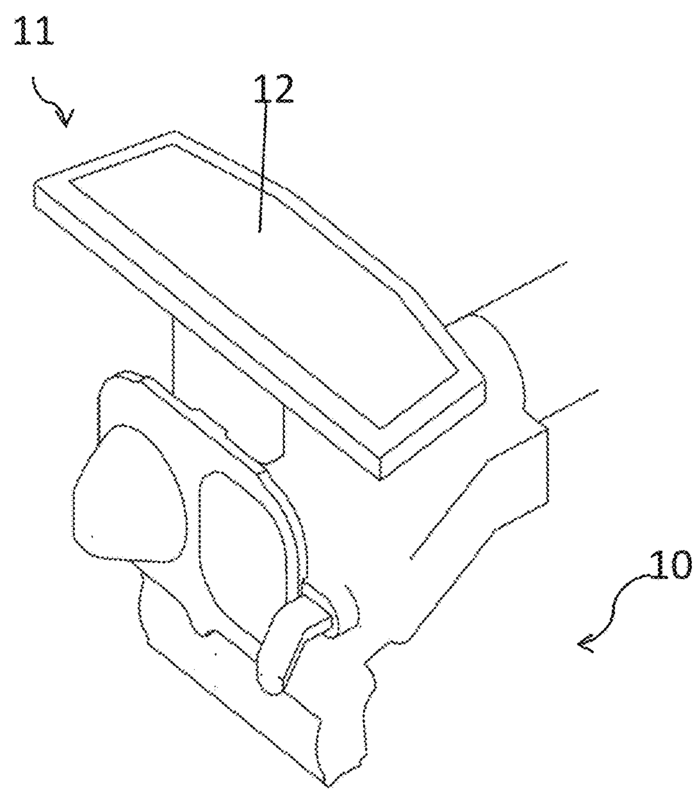

FIG. 3 shows an isometric view of the coupling part 10 with the fixed transition step 11 of FIG. 2.

The transition step 12 comprises a tread surface 12. The shape of the tread surface 12 is polygonal with a long side and a plurality of smaller sides, preferably the tread surface comprises substantially the shape of a bisected decagon with a long side along a bisecting line and five shorter sides, two sides adjoining the long side at an acute angle. The shape of the tread has been selected so as not to impede deflection of the coupler and/or extension of the sliding tread.

Figure 4:
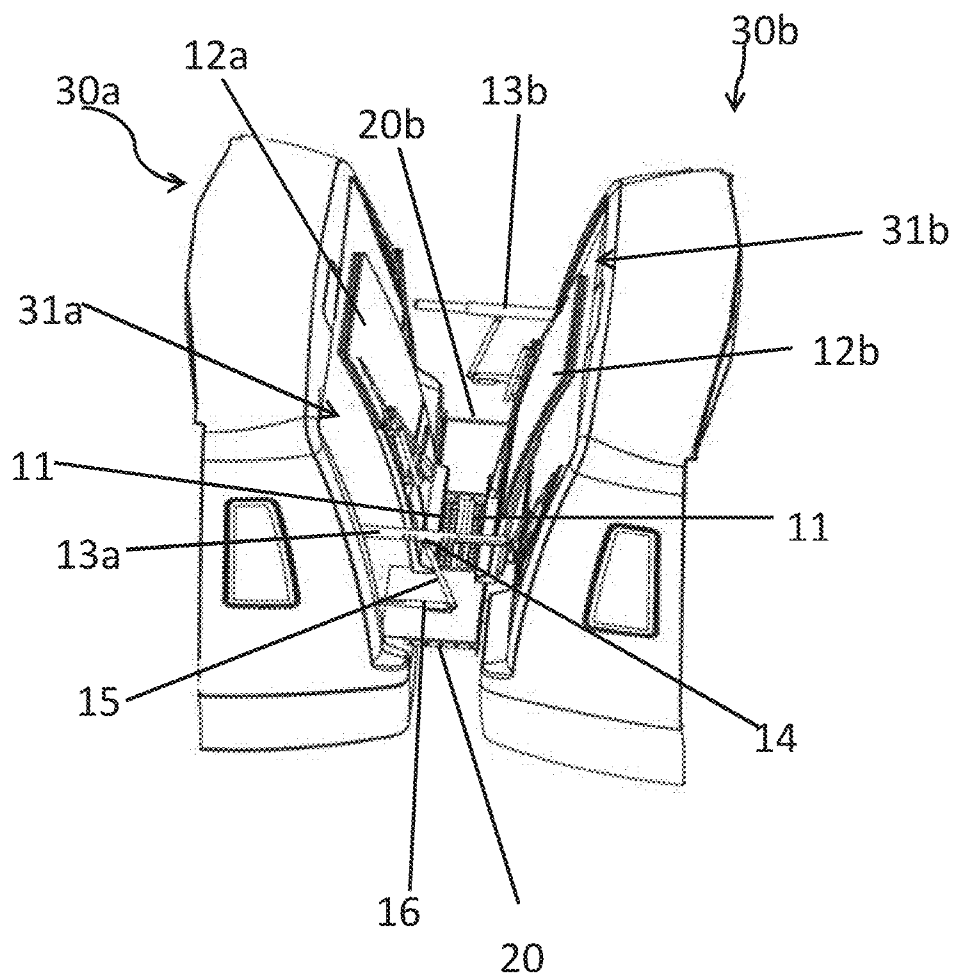

FIG. 4 shows two rail vehicle cars 30*a* and 30*b* in perspective view. The rail cars 30*a* and 30*b* are connected by means of a gangway so that passengers can transfer from one rail car to the other, for example in the event of an evacuation of one of the rail cars.

Two railings 13*a* and 13*b* are shown. Each railing 13 comprises a telescopic handrail 14, a retractable post 15 and a retractable bottom rail 16 (numbered in the figure only in the case of railing 13*a*).

To form a transition, the first step is to issue an extension command via a switch. The sliding steps 20*a* and 20*b* are extended. Then the door leaves 12*a* and 12*b* are opened. Railings 12*a* and 13*b* are extended and folded open. The passengers can then leave the rail vehicle car to be evacuated, for example rail vehicle car 30*a*. To do this, they first enter the sliding step 20*a* of the rail vehicle car 30*a*. Then they enter the fixed transition steps 11*a* and 11*b* to reach the sliding step 20*b* of the rail vehicle car 30*b*. From there, they can enter the rail vehicle car 30*b* through the door opening.

The railings 13*a* and 13*b* can be folded back and retracted, and the door leaves 12*a* and 12*b* can be closed and the sliding steps 20*a* and 20*b* retracted.

Such an evacuation arrangement allows both a wide field of vision and driver's desk for the vehicle driver, as well as evacuation from such an end car to an adjoining end car.

The invention claimed is:

1. A rail vehicle car for transporting passengers, comprising:

a wagon body, a wagon body floor, a wagon body ceiling, a front end region, one single A-pillar being arranged in the front region and two side pillars being arranged in the front region, the wagon body having a longitudinal extent and a transverse extent, and the longitudinal extent being greater than the transverse extent, wherein the car body comprises a height extension transverse to the longitudinal and transverse extension, the one single A-pillar is arranged substantially in the middle in a transverse direction so that the front area is divided into a first and a second side, and the first side comprises 30-70% of the transverse extension, wherein the rail vehicle car comprises at least one energy absorption element for absorbing crash energy, wherein the at least one energy absorption element is arranged on the A-pillar above an underframe level of the rail vehicle car.

2. The rail vehicle car according to claim 1, wherein at least one of the energy absorption elements is arranged on each side of the front area.

3. The rail vehicle car according to claim 2, wherein the at least one energy absorption element is designed as two parts, a first part element comprising a crash module and a second part element comprising a crash box.

4. The rail vehicle car according to claim 1, wherein the at least one energy absorption element is designed in two parts, a first part element comprising a crash module and a second part element comprising a crash box.

5. The rail vehicle car according to claim 1, wherein the car body comprises two pillars arranged laterally in the transverse direction.

6. The rail vehicle car according to claim 1, wherein the A-pillar is connected to the wagon body structure via the wagon body floor and the wagon body ceiling.

7. The rail vehicle car according to claim 1, wherein the rail vehicle wagon comprises at least one door with at least one door leaf, the door is arranged in the front region, the door leaf prevents passage through the door in a closed state, the at least one door is arranged laterally in the transverse direction with respect to a vehicle center, so that, when the door leaf is open, the vehicle body can be entered or exited through the vehicle body front, and the at least one door leaf being arranged substantially in the vehicle center in the transverse direction.

8. The rail vehicle car according to claim 7, wherein the rail vehicle car comprises only one door in the front region, and an operating panel for a vehicle driver being arranged on the side of the car body without doors in the front region.

9. The rail vehicle car according to claim 1, wherein the rail vehicle wagon in the front region comprises a sliding step for transition to an adjoining rail vehicle wagon or a further step.

10. The rail vehicle car according to claim 9, wherein the sliding step comprises a sensor for measuring a possible exit depth.

11. The rail vehicle car according to claim 10, wherein the sliding step is substantially as wide as the door.

12. The rail vehicle car according to claim 9, wherein the sliding step is substantially as wide as the door.

13. The rail vehicle car according to claim 1, wherein the rail vehicle car comprises in the front region at least a first part of a coupling, and the rail vehicle comprises at least one fixed transition step.

14. The rail vehicle car according to claim 13, wherein the transition step comprises a step surface having a step surface length formed in the longitudinal extension direction of the car body and a step surface width formed transversely to the longitudinal extension direction of the car body, a shape of the step surface being selected such that deflection of the coupling and extension of the sliding step is not impeded.

15. The rail vehicle car according to claim 13, wherein the transition step comprises a step surface having a step surface length formed in the longitudinal extension direction of the car body and a step surface width formed transversely to the longitudinal extension direction of the car body, a shape of the step surface being selected such that deflection of the coupling or extension of the sliding step is not impeded.

16. The rail vehicle car according to claim 1, wherein the rail vehicle wagon comprises a railing for securing access to the sliding and transition step.

17. A rail vehicle comprising at least one rail vehicle car according to claim 1.

18. A method of forming a transition between rail vehicle cars, the method comprising the steps of:

providing a first and a second rail vehicle car according to claim 1 each having a sliding step and a door leaf extending the respective sliding steps of the first and the second rail vehicle car, and opening the respective door leaves of the first and the second rail vehicle car.

19. The rail vehicle car according to claim 1, wherein that at least one of the energy absorption element is arranged on each side of the front area.

20. The rail vehicle car according to claim 1, wherein the rail vehicle wagon comprises a railing for securing access to the sliding or transition step.

* * * * *